US012185848B2

(12) United States Patent
Diederichs et al.

(10) Patent No.: US 12,185,848 B2
(45) Date of Patent: Jan. 7, 2025

(54) SWING DOOR SYSTEM AND A FREEZER DEVICE

(71) Applicants: SCHOTT AG, Mainz (DE); SCHOTT Flat Glass CR, s.r.o., Valašské Meziříčí (CZ)

(72) Inventors: Jochen Diederichs, Mainz (DE); Petr Smajser, Štramberk (CZ); Martin Rafaj, Vsetín (CZ); Michael Lammel, Aachen (DE); Benjamin Lederhofer, Langenfeld (DE); Markus Heller, Herzogenrath (DE); Jaroslav Kukulis, Roznov pod Radhostem (CZ); Jaroslav Placek, Zenklave (CZ)

(73) Assignees: SCHOTT AG, Mainz (DE); SCHOTT TERMOFROST S.R.O., Valaské Meziií (CZ)

(*) Notice: Subject to any disclaimer, the term of this patent is extended or adjusted under 35 U.S.C. 154(b) by 249 days.

(21) Appl. No.: 16/868,108

(22) Filed: May 6, 2020

(65) Prior Publication Data

US 2020/0352355 A1 Nov. 12, 2020

(30) Foreign Application Priority Data

May 6, 2019 (EP) .................................... 19172797
Oct. 28, 2019 (DE) ..................... 20 2019 105 967.2

(51) Int. Cl.
*A47F 3/04* (2006.01)
*F25D 23/02* (2006.01)

(52) U.S. Cl.
CPC ............ *A47F 3/043* (2013.01); *A47F 3/0434* (2013.01); *E05Y 2900/306* (2013.01); *F25D 23/028* (2013.01)

(58) Field of Classification Search
CPC . E05Y 2900/306; F25D 23/028; F25D 23/02; F25D 21/04; A47F 3/04; A47F 3/043; A47F 3/0426; A47F 3/0434
See application file for complete search history.

(56) References Cited

U.S. PATENT DOCUMENTS 2,137,165 A * 11/1938 Knight .................... F25D 23/02 16/221
2,449,384 A * 9/1948 Hursey .................. F25D 21/04 62/277

(Continued)

FOREIGN PATENT DOCUMENTS

CN 102939030 2/2013
JP S57130190 8/1982

(Continued)

OTHER PUBLICATIONS

DIN EN ISO 23953-2 (Sep. 2012) 90 pages.

*Primary Examiner* — Kimberley S Wright
(74) *Attorney, Agent, or Firm* — Ruggiero McAllister & McMahon LLC

(57) ABSTRACT

A swing door system for use with a freezer device is provided. The system includes two adjacent swing doors and a mullion in contact with the swing doors. Each swing door has a transparent pane and a non-transparent area. The non-transparent area is proximal to the mullion when the swing doors are in a closed position. The non-transparent areas and the mullion define a non-transparent region. The system has, under a horizontal viewing angle between 0° and 180° with respect to the plane in which the swing doors are arranged when the swing doors are in the closed position, all of the horizontal diameters of the non-transparent region are less than 100 mm.

24 Claims, 10 Drawing Sheets

(56) References Cited

U.S. PATENT DOCUMENTS

| | | | | | |
|---|---|---|---|---|---|
| 4,004,370 | A * | 1/1977 | Heaney | F25D 23/02 | 49/504 |
| 4,588,235 | A * | 5/1986 | Barroero | A47F 3/043 | 49/504 |
| 4,831,780 | A * | 5/1989 | Bockwinkel | F25D 23/082 | 49/478.1 |
| 6,029,411 | A * | 2/2000 | Richardson | E06B 3/66366 | 49/504 |
| 6,406,108 | B1 * | 6/2002 | Upton | A47F 3/001 | 312/223.5 |
| 6,578,978 | B1 * | 6/2003 | Upton | F25D 27/00 | 362/125 |
| 9,157,675 | B2 * | 10/2015 | Howington | F25D 21/04 | |
| 9,389,013 | B2 * | 7/2016 | Rolek | A47F 3/0426 | |
| 9,554,660 | B2 * | 1/2017 | Chubb | E05D 5/0238 | |
| 11,178,981 | B2 * | 11/2021 | Twohy | A47F 3/0434 | |
| 2001/0003408 | A1 * | 6/2001 | Otto | A47F 3/043 | 312/401 |
| 2003/0163961 | A1 * | 9/2003 | Richardson | E06B 3/66366 | 52/204.7 |
| 2006/0245205 | A1 * | 11/2006 | Hughes | A47F 3/001 | 362/125 |
| 2007/0022667 | A1 * | 2/2007 | Olofsson | A47F 3/001 | 49/504 |
| 2010/0018232 | A1 * | 1/2010 | Bratton | A47F 3/0426 | 62/264 |
| 2011/0043089 | A1 * | 2/2011 | Chubb | E05D 5/0238 | 312/405.1 |
| 2012/0062080 | A1 | 3/2012 | Maslen | | |
| 2013/0208447 | A1 | 8/2013 | Maslen | | |
| 2013/0285517 | A1 * | 10/2013 | Wach | A47F 3/043 | 49/504 |
| 2016/0047592 | A1 * | 2/2016 | Rolek | F25D 23/065 | 312/406.1 |
| 2019/0059613 | A1 | 2/2019 | Artwohl | | |
| 2019/0274451 | A1 * | 9/2019 | Twohy | A47F 3/001 | |

FOREIGN PATENT DOCUMENTS

| | | | | |
|---|---|---|---|---|
| JP | S60155881 | | 10/1985 | |
| JP | 2002364978 | A * | 12/2002 | |
| JP | 2012013304 | | 1/2012 | |
| JP | 2017191747 | | 10/2017 | |
| WO | 2008029801 | | 3/2008 | |
| WO | WO-2014019625 | A1 * | 2/2014 | A47F 3/0426 |
| WO | WO-2015127996 | A1 * | 9/2015 | A47F 3/043 |
| WO | WO-2018080482 | A1 * | 5/2018 | A47F 3/001 |

* cited by examiner

SWING DOOR SYSTEM AND A FREEZER DEVICE

CROSS REFERENCE TO RELATED APPLICATION

This application claims benefit under 35 USC § 119 of European Application EP 19 172 797.3 filed May 6, 2019 and DE 20 2019 105 967.2 filed Oct. 28, 2019, the entire contents of both of which are incorporated herein by reference.

BACKGROUND

1. Field of the Invention

The present invention relates to a swing door system for use with a freezer device, comprising two adjacent swing doors and at least one mullion being in contact with the swing doors, wherein each swing door comprises a transparent pane and a non-transparent area, wherein each non-transparent area is proximal to the mullion when the swing doors are in a closed position, and wherein the non-transparent areas and the mullion define a non-transparent region.

Further, the present invention relates to a freezer device comprising at least one swing door system.

2. Description of Related Art

Freezer devices are used for example in supermarkets and other stores for presenting frozen goods. Conventional frames and doors for freezer devices typically comprise robust and large profile structures. These structures block the view of the consumers during their shopping journey onto the presented goods in the freezer device.

In particular, conventional freezer devices comprise very large profile structures since the inner of the cabinet has to be cooled down such that frozen products, for example vegetables, frozen meat, frozen pizza etc. can be kept inside the freezer. To enable the large temperature difference between the inner of the freezer and the ambient temperature these freezers comprise insulating and therefore bulky doors. Hence, accordingly wide and robust profiles have to be used for receiving these bulky doors and as mentioned before block a person's view to the inside of the freezer.

Embodiments of the present invention therefore address the problem of improving and further developing a swing door system and a freezer device such that an increased product visibility is achieved in particular when a person is accessing the device and is standing in front of the device.

SUMMARY

In an embodiment the present invention provides a swing door system for use with a freezer device, comprising two adjacent swing doors and at least one mullion being in contact with the swing doors, wherein each swing door comprises a transparent pane and a non-transparent area, wherein each non-transparent area is proximal to the mullion when the swing doors are in a closed position, and wherein the non-transparent areas and the mullion define a non-transparent region, and wherein under an horizontal viewing angle between 0° and 180° with respect to the plane in which the swing doors are arranged when the swing doors are in the closed position all of the horizontal diameters of the non-transparent region are less than 100 mm, preferably less than 80 mm, more preferably less than 70 mm, most preferably less than 60 mm, preferably in any given height, i.e. over the whole vertical height of the transparent panes.

The disclosure further describes a mullion for a swing door system, preferably for a swing door system, wherein a width and/or a depth of the mullion is less than 70 mm, preferably less than 60 mm, more preferably less than 50 mm, most preferably less than 45 mm.

In a further embodiment, the present invention provides a freezer device comprising at least one swing door system being arranged in a cabinet, such that the opening direction of the swing door system is horizontal.

One of the advantages is that the visibility of the products is increased at least when a customer is looking into the freezer under a horizontal viewing angle between 0° and 180°. Thereby, the non-transparent region is minimized without reducing the mechanical stability of the freezer device. It is noted that the swing door system is preferably arranged such that the opening direction of the swing door system is horizontal.

The technical features described with respect to the mullion of a freezer device can also be realized by a mullion according to this disclosure.

The term "freezer device" refers to a device in which the temperature of the foodstuff is typically kept between −12° C. and −30° C. on normal conditions of use. Normal conditions are defined as operating conditions which exist when the cabinet, including all permanently located accessories, has been set up and situated in accordance with the recommendations of the manufacturer and is in service. Typical examples for such foodstuff are the products which are stored according to EN 23953, part 2 (September 2012) in the temperature classes L1, L2 and L3.

The term "mullion" refers to a vertical profile attached to the mounting frame of a freezer device where two adjacent doors in a freezer device meet. Traditionally, mullions have been used to create a central support surface against which the doors can rest in a sealed fashion when the doors are in a closed position.

The term "vertical side" refers to a vertical profile of the mounting frame at the outer positions of a freezer cabinet (typically left or right).

The term "horizontal profile" refers to the horizontal profile of the mounting frame of a freezer device. Typically, one upper horizontal profile and one lower horizontal profile is provided.

The term "mounting frame" refers to a support structure having upper and lower horizontal profiles, left and right vertical sides. At least a pair of reversible doors can be swingably mounted in the mounting frame in selective left- and right-hand opening directions.

In a cabinet several mounting frames can be mounted. Alternatively, the horizontal profiles of one device can be arranged in a line of profiles.

It should be noted that a mullion and/or a vertical side and/or a horizontal profile can be incorporated into a cabinet structure of a freezer device.

The term "non-transparent" refers to a region, area or the like in which the view on the goods, products or the like inside the freezer device is obstructed or blocked by one or more opaque elements of the freezer device, for example by spacers, profiles, gaskets, a mullion or by the swing doors.

The skilled person understands that a person's viewing direction comprises a vertical part and a horizontal part. Therefore, the term "horizontal viewing angle" is defined by the angle between the projection of the viewing direction into a horizontal plane and the plane in which the swing doors are arranged when the swing doors are in a closed position. Furthermore, the plane in which the swing doors are arranged when the swing doors are in a closed position refers to the surface of the transparent pane outside of the freezer device.

The term "horizontal diameter" refers to a length measured in the horizontal plane in a given height. Therefore, the horizontal diameter of the non-transparent region in a given height depends on the horizontal viewing angle and describes the length of the region in which the view onto the products is blocked.

The term "width" refers to a horizontal length measured in the plane in which the swing doors are arranged when the swing doors are in the closed position. Therefore, the width of the non-transparent region corresponds to the horizontal diameter under a viewing angle of 90° with respect to the plane in which the swing doors being arranged when the swing doors are in a closed position.

The term "depth" refers to a length measured in the plane being perpendicular to the plane in which the swing doors are arranged when the swing doors are in the closed position. Therefore, the depth of the non-transparent region corresponds to the horizontal diameter under a viewing angle of 0° or 180° with respect to the plane in which the swing doors being arranged when the swing doors are in a closed position.

The term "vertical" refers to the direction aligned with the direction of the force of gravity, up or down, as materialized with a plumb line.

The term "horizontal" refers to the direction being perpendicular to the vertical direction.

According to a further embodiment, under an horizontal viewing angle between 0° and 180° with respect to the plane in which the swing doors are arranged when the swing doors are in the closed position at least one of the horizontal diameters of the non-transparent region is less than 80 mm, preferably less than 70 mm, more preferably less than 50 mm, most preferably less than 45 mm. Hence, a person's view into the freezer device is less blocked compared to known devices that comprise large non-transparent components like profiles.

In another embodiment, preferably in any given height of the transparent pane, and under an horizontal viewing angle between 0° and 180° with respect to the plane in which the swing doors are arranged when the swing doors are in the closed position the ratio between the largest horizontal diameter of the non-transparent region and the smallest horizontal diameter of the non-transparent region is less than 2, preferably less than 1.5, more preferably less than 1.2. Thereby the non-transparent region is further minimized.

In a further embodiment, the width of the non-transparent region is less than 70 mm, preferably less than 60 mm, more preferably less than 50 mm, most preferably less than 45 mm. This has the advantage that the visibility of the products is improved when a customer is viewing under a viewing angle of approximately 90° into the freezer device.

According to an embodiment, the width of the non-transparent region ranging from 25 mm to 60 mm, preferably from 25 mm to 50 mm, most preferably from 25 mm to 40 mm. A respectively dimensioned non-transparent region improves the visibility during the selection phase, i.e. when the customer stands in front of the closed swing doors. A further advantage is that a stable and mechanically reliable structure of the device is provided.

In a further embodiment, the depth of the non-transparent region is less than 70 mm, preferably less than 60 mm, more preferably less than 50 mm, most preferably less than 45 mm. The depth of the non-transparent region is preferably ranging from 25 mm to 60 mm, more preferably ranging from 25 mm to 50 mm, most preferably from 25 mm to 40 mm. The advantage of a freezer device having an aforementioned dimensioned non-transparent region is that the visibility of the products is improved compared to state of the art solutions when the customer is viewing under an angle of approximately 45° into the freezer device.

According to a further embodiment, a cross-section of the mullion is T-shaped or Y-shaped or triangle-shaped. A T-shaped mullion has the advantage of providing a very solid structure. A Y-shaped mullion has the further advantage that cabling or light fixtures can be hidden behind the mullion so that the view of a customer is not distracted by the cabling. A triangle-shaped mullion provides enhanced flexibility, e.g. it can serve as a cable duct.

According to a further embodiment, a part of the mullion reaches in between the two adjacent swing doors, when the swing doors are in the closed position. This leads to a further improved solidity and mechanical stability of the mullion. A further advantage is that the depth of the swing door system is minimized, when the mullion reaches between the adjacent swing doors. In the state of the art a mullion has the shape of a cuboid profile that comprises a cavity. These mullions achieve the necessary bending stiffness due to their large width and depth. A mullion that reaches in between the adjacent swing doors and/or has a T-shape achieves its bending stiffness due to its special design and therefore its width and depth can be smaller compared to cuboid state of the art mullions.

According to another embodiment, an insulation profile is attached to the mullion. An advantage of the insulation profile is that it insulates the mullion against the inside of a freezer device. Furthermore, the insulation profile serves to mechanical stabilize the mullion. In a further embodiment, the insulation profile is attached to the mullion form-fit and/or force-fit at least at different fixation points. For example, it is possible to attach the insulation profile at different fixation points via screws and/or rivets and/or other fixation elements to the mullion. The fixation points can be arranged, preferably equidistant, at least over 80% of the height of the mullion. Furthermore, the insulation profile can be firmly bonded to the mullion. The insulation profile can be attached with an adhesive and/or an adhesive tape and/or via welding and/or via soldering at different fixation points to the mullion. In a preferred embodiment, the fixation points can be arranged, preferably equidistant, at least over 80% of the height of the mullion. Furthermore, it is possible to firmly bond the insulation profile over its whole length to the mullion.

Attaching the insulation profile to the mullion in one of the before mentioned ways has the advantage that the robustness in terms of bending stiffness is highly increased compared to a mullion that does not comprise an insulation profile.

The insulation profile can be made of plastic, preferably of a polymer, more preferably of polyvinyl chloride (PVC) or fiber reinforced plastics, or of a metal. These materials have the advantage that they have a low thermal conductivity. Furthermore, they are easy to process.

In another embodiment, the insulation profile comprises a space, for example a recess or a cavity, and wherein the space of the insulation profile is filled with a thermally insulating material. Filling the insulation profile with a thermally insulating material has the advantage that a better thermal insulation as well as a better mechanical stabilization can be achieved. Furthermore, the insulation profile can comprise at least partly a C-shaped cross section, for encompassing the mullion. The thermal insulating material can be a foam, preferably a polyurethane (PUR) foam. A foam, especially a polyurethane foam has the advantage that it is easy to apply to the insulation profile and that it provides excellent insulation and mechanical stabilization.

In a further embodiment, the mullion is integrally formed, at least in the region that extends from the bottom to the top of the two adjacent doors. This has the advantage that the mullion is extremely robust. Alternatively, the mullion comprises at least two elements that are coupled to each other form-fit and/or force-fit and/or is firmly bonded, for example welded or glued, at least in the region that extend from the bottom to the top of the two adjacent swing doors. This has the advantage that whichever geometry of the mullion can be manufactured easily.

According to a further embodiment, the mullion can comprise a cavity. The cavity can be used for example as a cable guide. Alternatively, the mullion can be solid, i.e. does not comprise a cavity. This has the advantage that the mullion is very robust and easy to manufacture.

According to a further embodiment, the mullion comprises at least one sealing surface, especially when the mullion has a flattened triangle shape. Alternatively, the mullion can comprise at least two sealing surfaces. Furthermore, preferably each of the two sealing surfaces can be inclined with respect to the plane in which the swing doors are arranged when the swing doors are in the closed position. Hence, the inside of the freezer can be hermetically sealed in such a way, that warm, humid air is kept from reaching the inside of the freezer when the adjacent swing doors are closed. This construction is especially advantageous when a gasket and magnetic means are provided in an area of the sealing surface because shear forces acting on the gasket during the intial phase when opening the swing doors are minimized.

According to another embodiment, a gasket is attached to the mullion and/or to the insulation profile. Alternatively or additionally, a gasket can be attached to at least one of the swing doors. Providing a gasket has the advantage that the inside of the cooling device can be sealed from the outside such that humidity penetration and airflow inside of the cooling device is reduced. Preferably, the gasket can be made of polyvinyl chloride (PVC) or a thermoplastic elastomer (TPE) or Acrylnitril-Butadien-Styrol (ABS). A gasket being made of PVC or TPE or ABS has the advantage that it is very durable. In another embodiment, the gasket and the insulation profile are arranged such as to form a barrier between the mullion and the interior of the freezer device when the adjacent swing doors are in the closed position. This has the advantage that an ideal thermal isolation of the mullion against the cold air inside of the freezer device is achieved.

According to a further embodiment, magnetic means are provided for magnetically connecting the swing doors to the mullion when the doors are in the closed position. Providing magnetic means is advantageous because the sealing of the inside of the freezer device from ambient air is further improved. In a preferred embodiment at least one permanent magnet is provided as magnetic means.

According to a further embodiment, the transparent pane of the swing door comprises a gasfilled insulating glass unit (IG) or a vacuum insulated glass unit (VIG). This provides the advantage that the inside of the device being insulated against the warm ambient air. Typically, the gasfilled insulating glass unit and/or the vacuum insulated glass unit comprise at least two glass panes, often three glass panes, being spaced apart from each other by one or more spacers. The glass panes may comprise a thickness of 3 mm to 5 mm, often 4 mm and/or may comprise an antifog-coating or an antifog foil and/or a heatable coating and/or a low-emissivity coating and/or an anti-reflective coating. In vacuum insulation glass units (VIG) the spacer elements may have a depth of 0.5 mm to 1.5 mm, preferably of below 1 mm. These spacer elements of the VIG are used in combination with a circumferential edge sealing. In gas filled insulation glass units (IG) the circumferential spacer may have a depth of 4 to 20 mm. The space between the glass panes can be filled with a gas in case of an insulating glass unit (IG) or may be evacuated in case of a vacuum insulated glass unit (VIG). For not obstructing the view through the glass units the spacers can be made of a transparent material. Generally, the transparent pane of the swing doors can comprise several glass panes one above the other.

According to a further embodiment, at least one of the swing doors is at least partly printed in the non-transparent region, preferably with a non-transparent ink. Printing the swing door in the non-transparent region is advantageous because an appealing design can be created in a cost effective way, especially by using a non-transparent ink.

According to a further preferred embodiment, the mullion is made of metal, preferably of aluminum or of steel, or of plastic, preferably of fiber reinforced plastics, or of plastic coated metal, preferably of plastic coated aluminum or of plastic coated steel or is made of a combination of before mentioned materials in combinations with other additionally attached parts . Providing a mullion made of metal has the advantage that the mullion is very rigid. A mullion made of aluminum has the further advantage that the mullion is lightweight. Providing a mullion made of steel is advantageous in that the mullion can be used as a magnetic counterpart for magnetic means, for example a permanent magnet, so providing a magnetic lock for the swing door in embodiments in which the gasket is placed on the door. A steel mullion may be painted or otherwise coated to achieve an appealing surface and protect against corrosion. Plastic has the advantage that it can be easily processed and provides low heat conduction. A mullion made of fiber reinforced plastic is lightweight and is rigid. Covering the metal with plastic avoids corrosion of the mullion. In a further embodiment, the mullion comprises at least one opening for decreasing the mass of the structure. The mullion can comprise further elements, such as a gasket or a magnet. These elements can of course be made of a different material than the mullion.

According to a further embodiment, each swing door is at least partly surrounded by a profile, preferably by a profile with an L-shaped cross-section. For example only one or both of the vertical sides of the swing door can comprise a profile. The profile provides a protection for the slim sides of a swing door. An L-shaped profile has the advantage that the edges of the swing door are further protected. By providing a solid profile the profile can be manufactured easily.

In another embodiment, the gasket is arranged such as to form a barrier between the profile, for example the L-shaped profile, and the interior of the freezer when the adjacent swing doors are in the closed position. With this construction, a better insulation of the inside of the freezer against the warm ambient air is achieved.

In another embodiment, the upper edge of the front glass pane towards the shop environment is extended in a way that it closes flush or higher than the mounting frame and/or the part of the device which is facing towards the shop. By using an extended front glass other parts of the device can be hidden which contributes to an appealing design.

In another embodiment, heating means are provided for heating at least a part of the mullion and/or at least a part of the horizontal profile/profiles, and/or wherein lighting means are provided for lighting at least a part of the cabinet. Heating the mullion and/or the horizontal profile/profiles avoids condensation by keeping the temperatures of the surfaces of these elements above the dew point. Providing lighting means is advantageous in that the goods being kept inside the freezer device can be presented to the consumer appealingly. Alternatively or additionally no heating means are provided for heating the swing doors. Especially when an insulation profile is attached to the mullion a heating of the swing doors can be unnecessary.

According to another embodiment, the rotating axis of at least one of the swing doors is positioned in the non-transparent region. Arranging the rotating axis in the non-transparent region has the advantage that parts or elements for providing angular movement around the rotating axis can be hidden. Typically, the rotating axis of at least one of the swing doors is off the center with respect to the depth of the non-transparent region. This arrangement of the rotating axis enables the swing door to be prevented from being blocked in its angular movement by the mullion.

According to a further embodiment, the rotating axis is positioned in the area between the adjacent swing doors. Positioning the rotating axis in the area between the adjacent swing doors has the advantage that a blocking of the doors in prevented with easy mechanical means.

In a preferred embodiment, at least one of the swing doors comprises a hinge at opposite ends of the at least one swing door. Thereby a rotating or pivoting-type mounting of the swing door can be achieved easily, therefore installation is enhanced.

There are several ways how to design and further develop the teaching of the present invention in an advantageous way. To this end, it is to be referred to the patent claims and to the following explanation of preferred examples of embodiments of the invention, illustrated by the drawing on the other hand. In connection with the explanation of the preferred embodiments of the invention by the aid of the drawing, generally preferred embodiments and further developments of the teaching will be explained.

DETAILED DESCRIPTION

Figure 1:
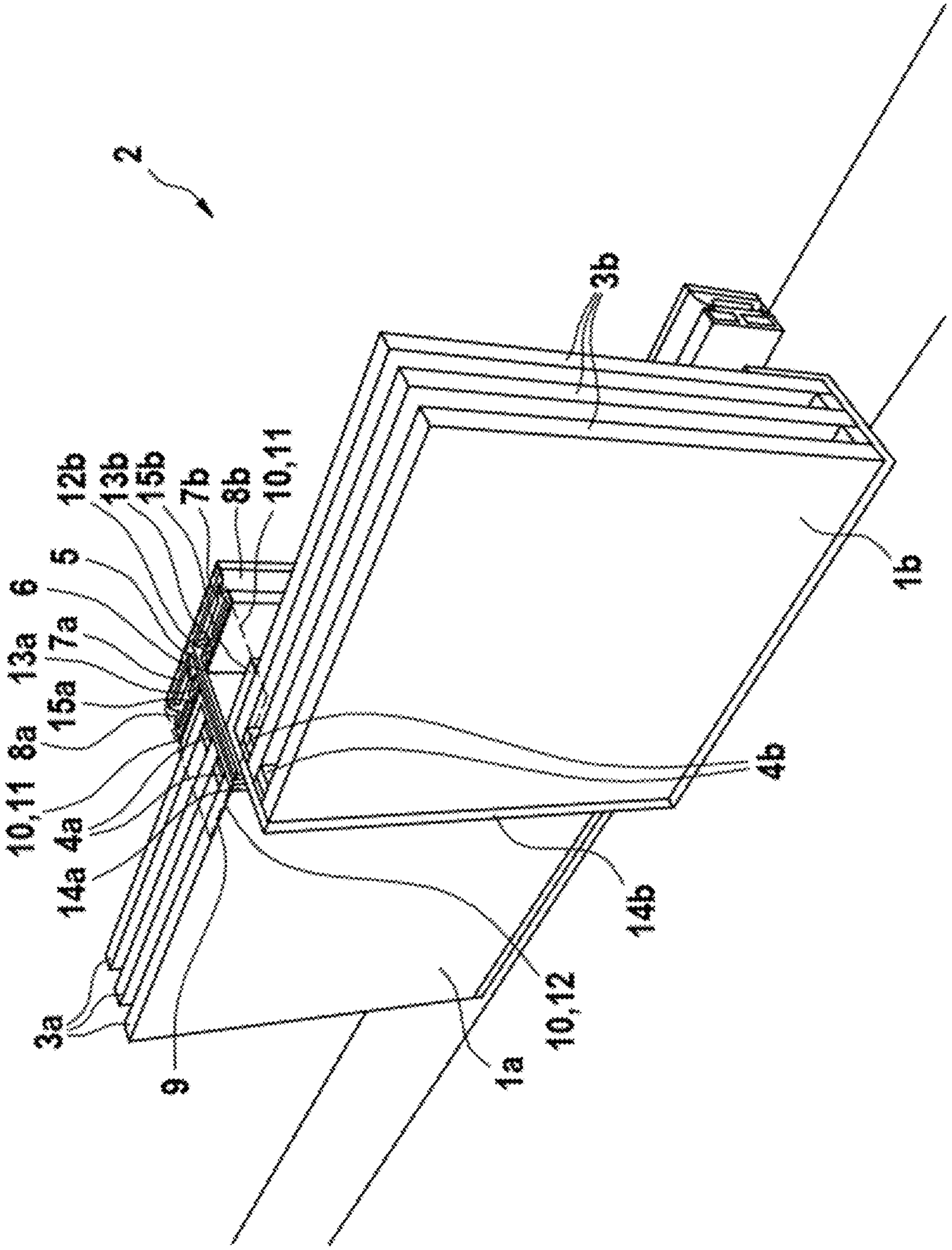
FIG. 1 shows a perspective view of a part of the adjacent swing doors of a swing door system according to an embodiment of the present invention.
Figure 2:
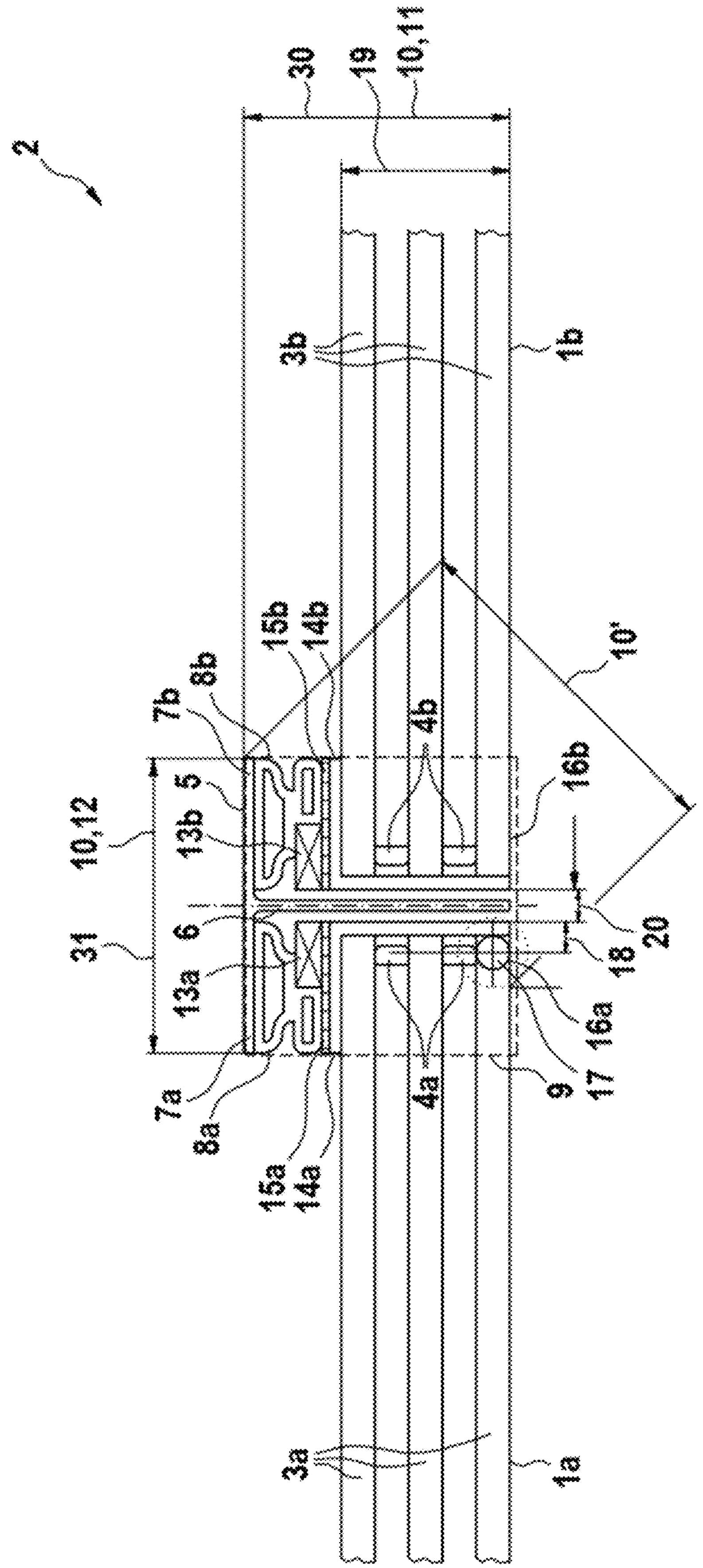
FIG. 2 shows a horizontal cross-sectional view of the swing doors system according to FIG. 1.

FIGS. 1 and 2 show different views of a part of the adjacent swing doors 1*a*, 1*b* of a swing door system 2 according to an embodiment of the present invention.

Each of the adjacent swing doors 1*a*, 1*b* comprising transparent panes 3*a*, 3*b*. The transparent panes 3*a*, 3*b* are spaced apart from each other by spacers 4*a*, 4*b*. The swing door system 2 further comprises a mullion 5 that has a T-shaped cross-section, wherein a part 6 of the mullion 5 reaches in between the adjacent swing doors 1*a*, 1*b*, when the swing doors 1*a*, 1*b* are in the closed position. It should be noted that the part 6 can be shorter such that it does not reach in between the adjacent swing doors 1*a*, 1*b*.

FIG. 1 further shows that the mullion 5 comprises two sealing surfaces 7*a*, 7*b* each comprising a gasket 8*a*, 8*b*. Each of the swing doors 1*a*, 1*b* comprises a profile 14*a*, 14*b*, a layer 15*a*, 15*b* and a print 16*a*, 16*b* that form a non-transparent area on each swing door 1*a*, 1*b*. The non-transparent areas of the swing doors 1*a*, 1*b* are each proximal to the mullion 5 when the swing doors 1*a*, 1*b* are in the closed position. The non-transparent areas and the mullion 5 together define a non-transparent region 9 that is marked in FIGS. 1 and 2 with a dashed square. Depending on the horizontal viewing angle, the horizontal diameter 10 of the non-transparent region 9 can be different. FIG. 2 shows that the depth 11 of the non-transparent region 9 is defined as the horizontal diameter 10 of the non-transparent region 9 being viewed under an horizontal viewing angle of 0° or 180° with respect to the plane in which the swing doors 1*a*, 1*b* are arranged when the swing doors 1*a*, 1*b* are in a closed position, i.e. the right or left side of the dashed square. The width 12 of the non-transparent region 9 is defined as the horizontal diameter 10 of the non-transparent region 9 being viewed under an horizontal viewing angle of 90° with respect to the plane in which the swing doors 1*a*, 1*b* being arranged when the swing doors 1*a*, 1*b* are in a closed position. Hence, the width 12 corresponds to the front side of the dashed square.

Due to the design of the mullion 5, the depth 11 and the width 12 of the non-transparent region 9 are extremely short and correspond at least essentially to the depth 30 and width 31 of the mullion 5. Because of the low depth 11 of the non-transparent region 9, the visibility inside of the freezer device is improved when the customer is viewing slantwise into the freezer. The low width 12 of the non-transparent region 9 improves the visibility during the selection phase, i.e. when a person is standing in front of the closed swing doors 1*a*, 1*b*.

Furthermore, FIGS. 1 and 2 show that each of the gaskets 8*a*, 8*b* comprise a magnet 13*a*, 13*b*. Each magnet 13*a*, 13*b* is positioned near the part 6 of the mullion 5. A solid L-shaped profile 14*a*, 14*b* protects each of the adjacent swing doors 1*a*, 1*b*. It should be noted that the L-shaped profile 14*a*, 14*b* forms a part of the non-transparent region 9 since it blocks a person's view of the products. In the closed position of the swing doors 1*a*, 1*b* the legs of each L-shaped profile 14*a*, 14*b* are parallel to the sealing surface 7*a*, 7*b* and the part 6 of the mullion 5. Moreover, the L-shaped profile 14*a*, 14*b* comprises a layer 15*a*, 15*b* of a material, preferably of metal, for example of steel, that interacts with the magnets 13*a*, 13*b* when the swing doors 1*a*, 1*b* are in the closed position. Thereby the swing doors 1*a*, 1*b* are held securely in the closed position such that the sealing of the inside of the freezer device is improved and the swing doors 1*a*, 1*b* can still be opened easily. Instead of providing a layer 15*a*, 15*b* the L-shaped profile 14*a*, 14*b* itself can be made of such a material that interacts with the magnets 13*a*, 13*b*.

Each of the adjacent swing doors 1*a*, 1*b* may comprise a print 16*a*, 16*b* with a non-transparent ink in the non-transparent region 10 as indicated only in FIG. 2.

According to FIG. 2, the rotating axis 17 of the left swing door 1*b* is positioned in the non-transparent region 9 with a distance 18 of 5 mm away from the external surface of the L-shaped profile 14*a*, 14*b*. With respect to the thickness 19 of the swing door 1*a*, the rotating axis 17 is off-centered, i.e. is positioned in alignment with the external transparent pane 3*a*. The depth 11 of the non-transparent region 9 is here 42 mm, wherein the width 12 of the non-transparent region 9 is 45 mm. Further, the thickness 19 of each swing door 1*a*, 1*b* without the L-shaped profile 14*a*, 14*b* is 26 mm. The gap 20 between the swing doors 1*a*, 1*b* in the closed position is 5 mm. If a customer looks under a horizontal view angle of 45° horizontally towards the non-transparent region 9 the horizontal diameter 10' of the non-transparent region 9 is 55 mm, i.e. the length defined by the left end of the print 15*a* and the right end of the sealing surface 7*b*.

Figure 3:
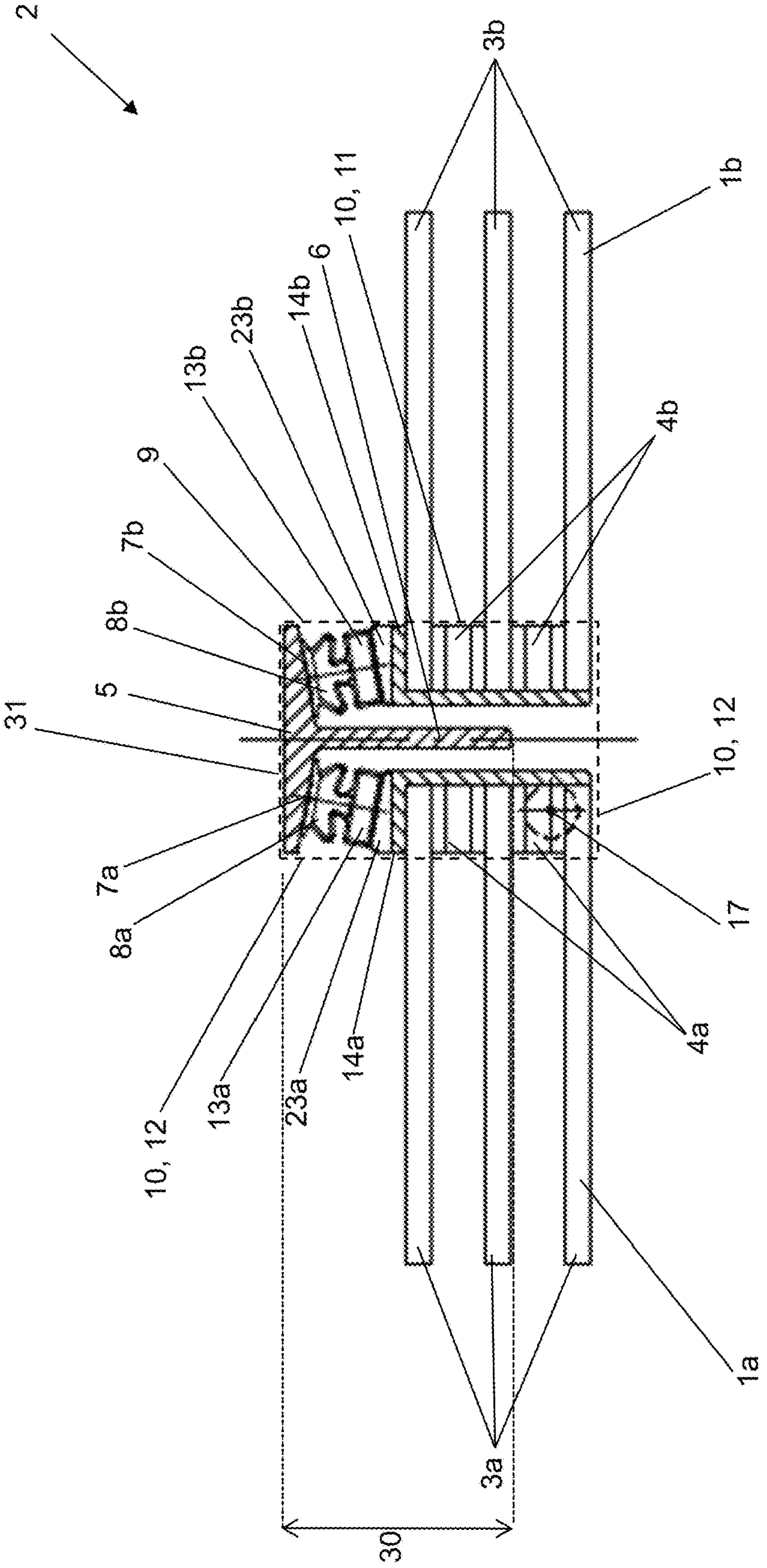
FIG. 3 shows a horizontal cross-sectional view of a swing door system according to a further embodiment of the present invention.
Figure 4:
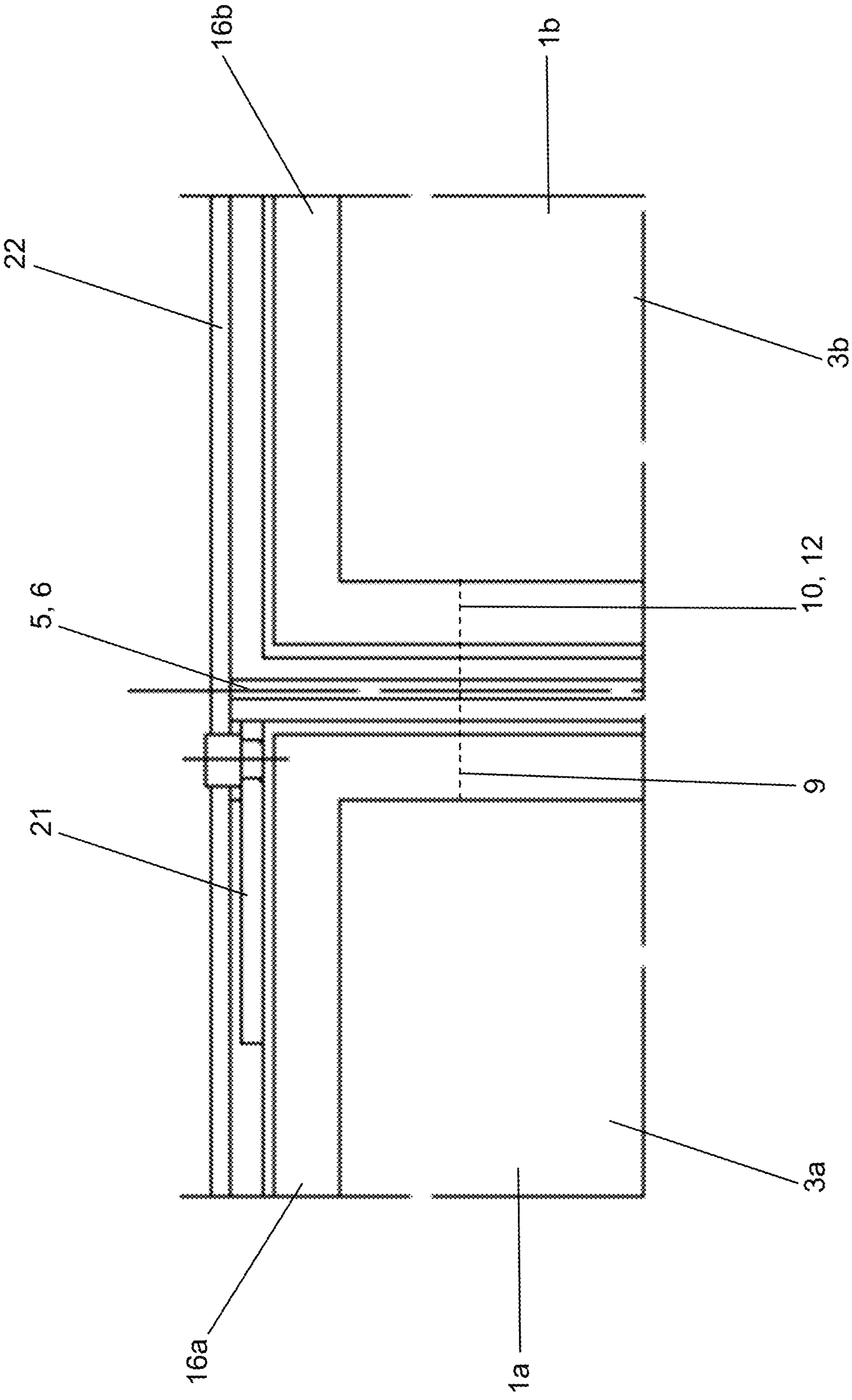
FIG. 4 shows a front view of the swing door system according to FIG. 3 mounted to a mounting frame.

FIGS. 3 and 4 show another embodiment of a swing door system 2. The swing door system 2 comprises two adjacent swing doors 1*a*, 1*b*, wherein each swing door 1*a*, 1*b* includes transparent panes 3*a*, 3*b* being spaced from each other by spacers 4*a*, 4*b*. Furthermore, a mullion 5 is arranged. The mullion 5 is T-shaped and comprises a part 6 that reaches between the adjacent swing doors 1*a*, 1*b*, when the swing doors 1*a*, 1*b* are in the closed position. It is possible that the part 6 is shorter, such that it does not reach in between the adjacent swing doors 1*a*, 1*b*. The depth 30 of the mullion 5 is shorter than the depth 11 of the non-transparent region 9. The width 31 of the mullion 5 equals the width 12 of the non-transparent region 9. The mullion further comprises sealing surfaces 7*a*, 7*b* onto which the gaskets 8*a*, 8*b* are fixed, for example glued or snapped into. The adjacent swing doors include wedges 23*a*, 23*b* that are made of a material that interacts with the magnets 13*a*, 13*b* of the gaskets. For example, the wedges 23*a*, 23*b* are made of steel. The sealing surfaces 7*a*, 7*b* of the mullion 5 are inclined with respect to the transparent panes 3*a*, 3*b* when the adjacent swing doors 1*a*, 1*b* are in the closed position. Hence, shear forces are minimized that are acting on the gaskets 8*a*, 8*b* when the swing doors 1*a*, 1*b* are opened, i.e. when the magnets 13*a* 13*b* are disconnected from the wedges 23*a*, 23*b*. Furthermore, due to the design of the mullion 5 the horizontal diameter 10 of the non-transparent region 9 is minimized, especially the depth 11 and the width 12. Furthermore the design of the mullion 5 avoids shear forces acting on the gasket during the intial phase when opening the swing doors are minimized.

FIG. 4 further shows that the left swing door 1 comprises a hinge element 21, such that the swing door 1*a* can be rotatable mounted to horizontal profile 22 of an outer frame. The right swing door 1*b* can comprise a hinge on its not shown right side.

Figure 5:
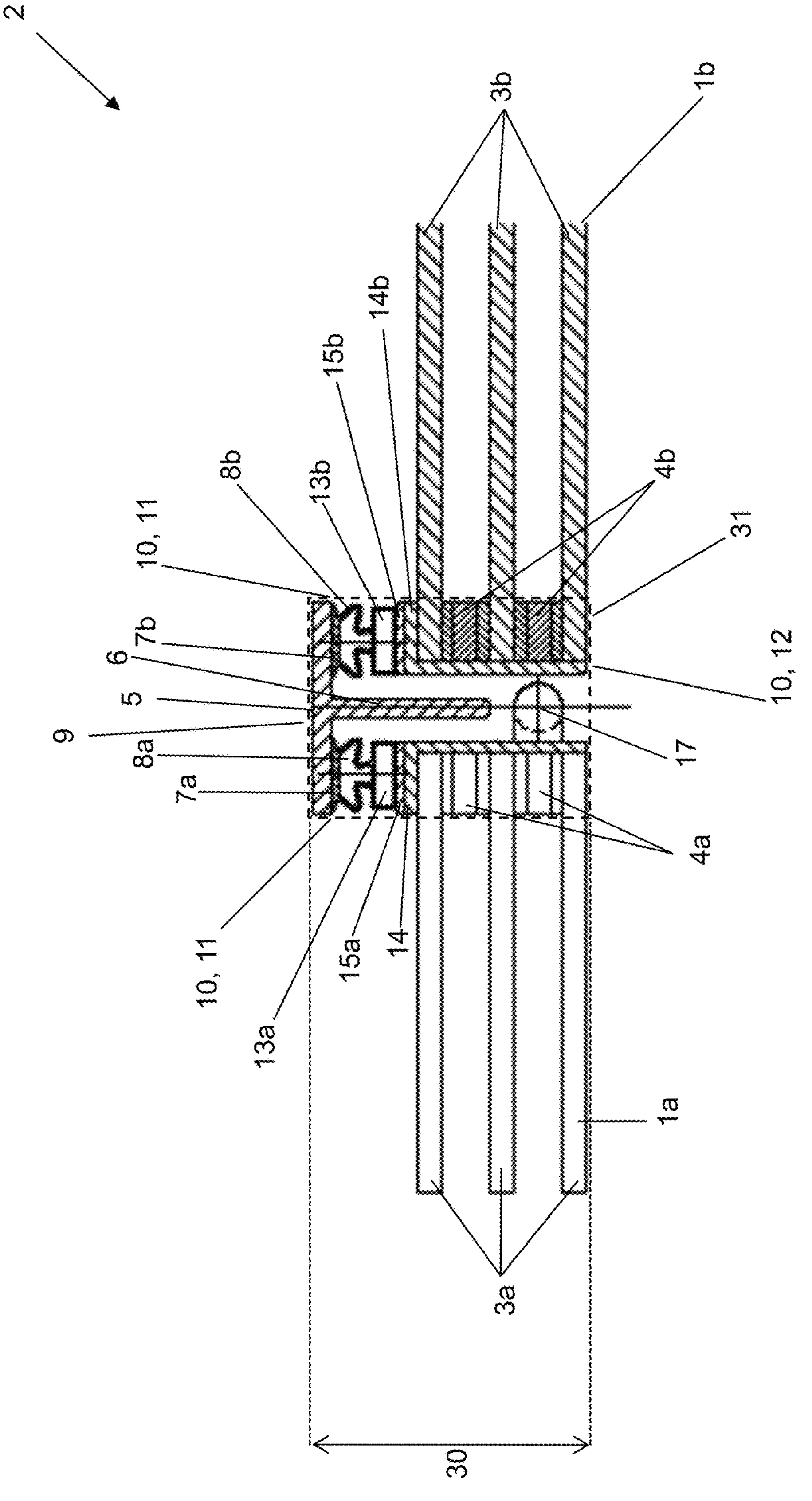
FIG. 5 shows a horizontal cross-sectional view of a swing door system according to a further embodiment of the present invention.
Figure 6:
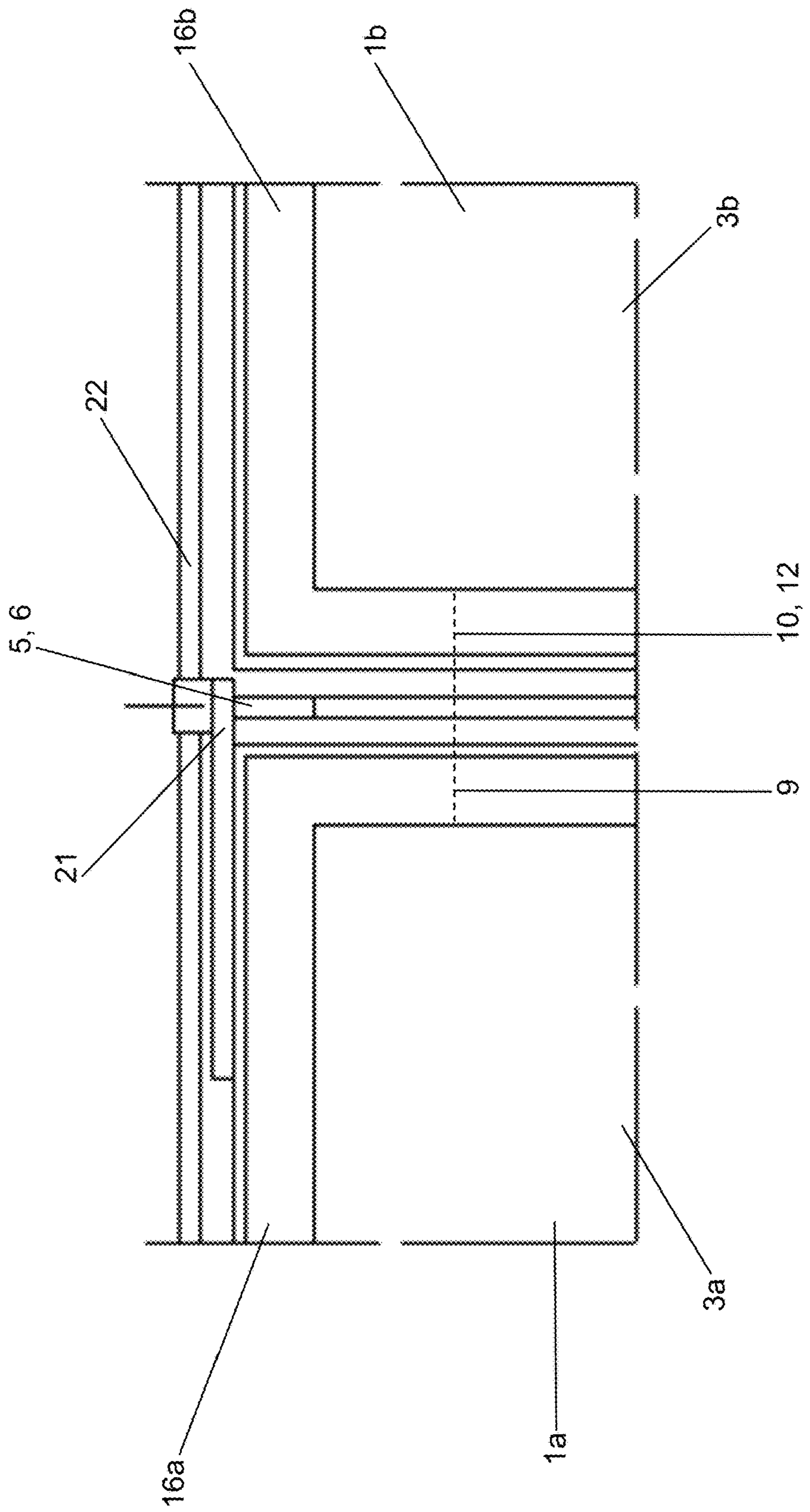
FIG. 6 shows a front view of the swing door system according to FIG. 5 mounted to a mounting frame.

FIGS. 5 and 6 show another embodiment of a swing door system 2. The swing door system 2 comprises two adjacent swing doors 1*a*, 1*b*, wherein each swing door 1*a*, 1*b* includes transparent panes 3*a*, 3*b* being spaced from each other by spacers 4*a*, 4*b*. Furthermore, a mullion 5 is arranged. The mullion 5 is T-shaped and comprises a part 6 that reaches between the adjacent swing doors 1*a*, 1*b*, when the swing doors 1*a*, 1*b* are in the closed position. The depth 30 of the mullion 5 is shorter than the depth 11 of the non-transparent region 9. The width 31 of the mullion 5 equals the width 12 of the non-transparent region 9. Hence, the swing door system 2 according to FIGS. 5 and 6 corresponds to the embodiment shown in FIGS. 1 and 2. In contrast to the embodiment of FIGS. 1 and 2 the rotating axis of the left door 1*a* is arranged between the adjacent swing doors 1*a*, 1*b*. Hence, shear forces are minimized that are acting on the gaskets 8*a*, 8*b* when the swing doors 1*a*, 1*b* are opened and the right door 1*b* is prevented from blocking the left door 1*a*, when the left door 1 is opened.

Figure 7:
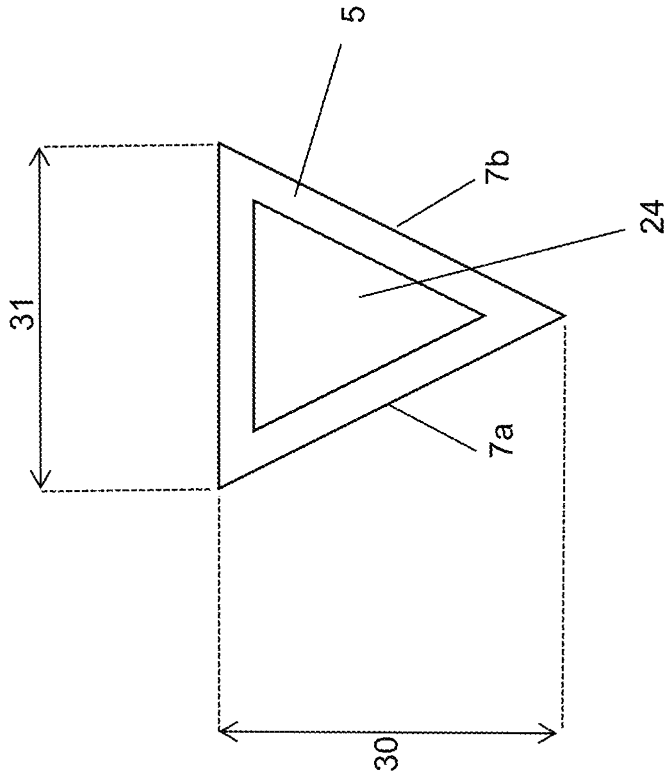
FIG. 7 shows a horizontal cross-sectional view of a mullion according to a further embodiment of the present invention.

FIG. 6 further shows that the left swing door 1 comprises a hinge 21, such that the swing door 1*a* can be rotatable mounted to a horizontal profile 22 of an outer frame. The right swing door 1can comprise a hinge on its not shown right side FIG. 7 shows a cross-sectional view parallel to the opening direction of a mullion 5 according to a further embodiment of the present invention. The mullion 5 has a triangle shaped cross section. Therefore, the sealing surfaces 7*a*, 7*b* of the mullion 5 are inclined with respect to the not shown transparent pane of the adjacent swing doors when the swing doors are in the closed position. A triangle shaped mullion 5 has the advantage that the inner part 24 of the mullion 5 can serve as a cable duct, heat pipes, heating elements or other elements.

Figure 8:
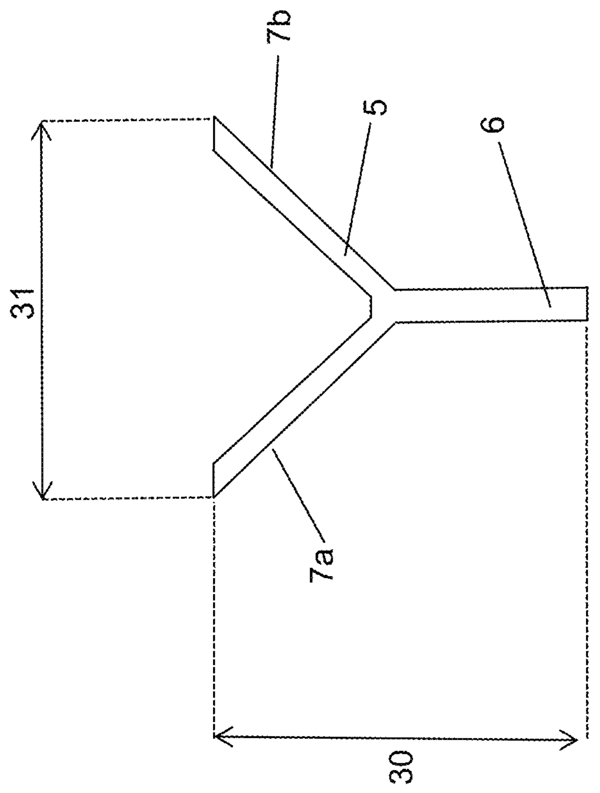
FIG. 8 shows a horizontal cross-sectional view of a mullion according to a further embodiment of the present invention.

FIG. 8 shows a cross-sectional view parallel to the opening direction of a mullion 5 according to a further embodiment of the present invention. The mullion 5 has a Y-shaped cross section. Therefore, the sealing surfaces 7*a*, 7*b* of the mullion 5 are inclined with respect to the not shown pane of the adjacent swing doors when the swing doors are in the closed position. The part 6 of the Y-shaped mullion 5 can reach in between the not shown adjacent swing doors. Furthermore, part 6 can be realized shorter, such that it does not reach in between the adjacent swing doors.

Figure 9:
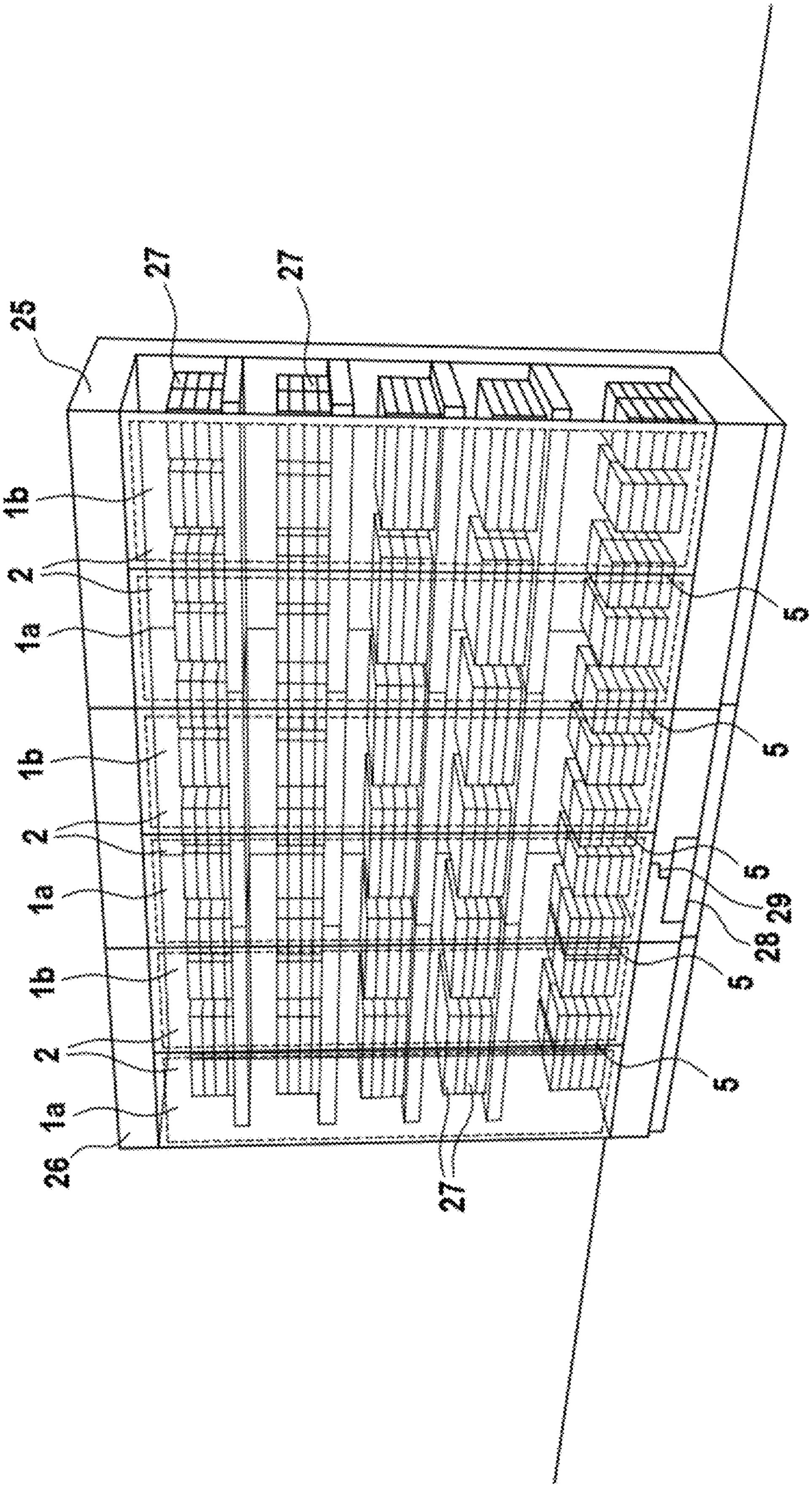
FIG. 9 shows a perspective view of a freezer device according to an embodiment of the present invention.

FIG. 9 shows a perspective view of a freezer device 25 according to an embodiment of the present invention. The freezer device 25 comprises a cabinet 26 and three swing door systems 2 each including two adjacent swing doors 1*a*, 1*b* and a mullion 5. The customer can see the products 27 through the transparent panes 3*a*, 3*b* of the swing doors 1*a*, 1*b*. Due to the low depth 11 and low width 12 of the non-transparent region 9, the person's view of the products 27 is improved when the person is viewing slantwise into the freezer device 2. Furthermore, the low width 12 of the non-transparent region 9 improves the view on the products 27, when the person stands in front of the freezer device 2.

Further, the freezer device 2 comprises an energy source 28 that is connected with an interface 29, which enables to provide energy to a heating element and/or light elements inside the swing doors 1*a*, 1*b*.

Figure 10:
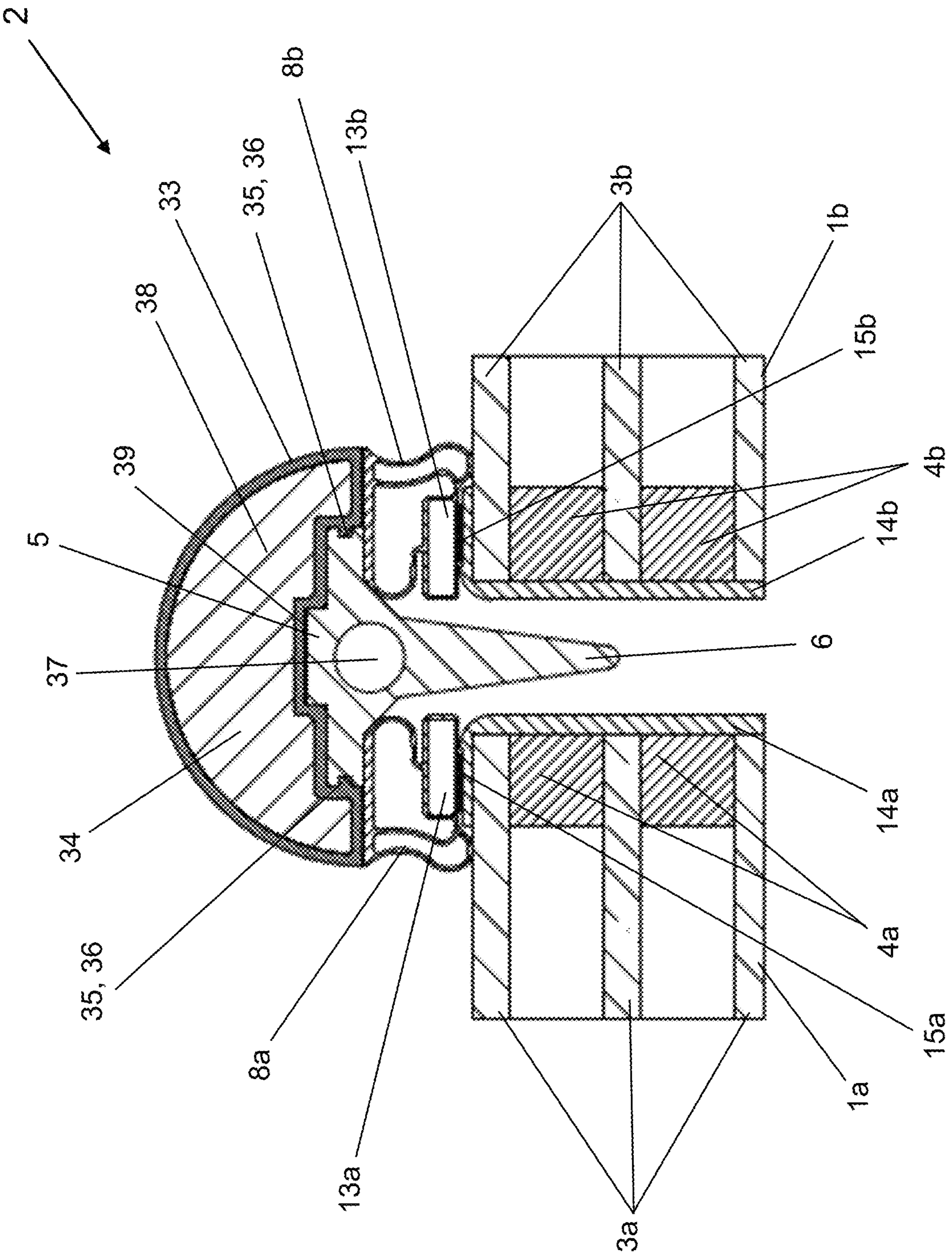
FIG. 10 shows a horizontal cross-sectional view of a swing door system according to a further embodiment of the present invention.

FIG. 10 shows another embodiment of a swing door system 2. The swing door system 2 comprises two adjacent swing doors 1*a*, 1*b*, wherein each swing door 1*a*, 1*b* includes transparent panes 3*a*, 3*b* being spaced from each other by spacers 4*a*, 4*b*. Furthermore, a mullion 5 is arranged. The mullion 5 is essentially triangle shaped and comprises a part 6 that reaches between the adjacent swing doors 1*a*, 1*b*, when the swing doors 1*a*, 1*b* are in the closed position. It is possible that the part 6 is shorter, such that it does not reach in between the adjacent swing doors 1*a*, 1*b* but at least points in this direction. Further, an insulation profile 33 is attached to the mullion 5. The insulation profile 33 comprises a space 38 that is filled with a thermally insulating material 34. In this embodiment, the space 38 is defined by a cavity, such that the insulation profile 33 is a hollow profile. The insulation profile 33 is firmly bonded to the mullion 5 with bonding material 39, for example with an adhesive tape. The insulation profile 33 can be attached at different fixation points or over its whole length to the mullion 5. Additionally, the insulation profile 33 comprises protuberances 35 that fit into recesses 36 of the mullion 5 for providing a force-fit and/or form-fit connection.

The mullion 5 further comprises a passage 37 for mounting the mullion 5 to the horizontal profiles, for example with screws.

Each of the swing doors 1*a*, 1*b* comprises an L-shaped profile 14*a*, 14*b*. Moreover, gaskets 8*a*, 8*b* are attached to the mullion 5 and the insulation profile 33. When the swing doors 1*a*, 1*b* are in the closed position the gaskets 8*a*, 8*b* form a barrier between the mullion 5 and the interior of the freezer. Additionally, the gaskets 8*a*, 8*b* are arranged such as to form a barrier between the L-shaped profiles 14*a*, 14*b* and the interior of the freezer when the swing doors 1*a*, 1*b* are in the closed position. By providing these two barriers, a very good thermal insulation is achieved such that a heating of the swing doors 1*a*, 1*b* is not necessary.

Further, each of the gaskets 8*a*, 8*b* comprises a magnet 13*a*, 13*b*. Moreover, the L-shaped profile 14*a*, 14*b* comprises a layer 15*a*, 15*b* of a material, preferably of metal, for example of steel, that interacts with the magnets 13*a*, 13*b* when the swing doors 1*a*, 1*b* are in the closed position. Thereby the swing doors 1*a*, 1*b* are held securely in the closed position such that the sealing of the inside of the freezer device is improved and the swing doors 1*a*, 1*b* can still be opened easily. Instead of providing a layer 15*a*, 15*b* the L-shaped profile 14*a*, 14*b* itself can be made of such a material that interacts with the magnets 13*a*, 13*b*.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

| LIST OF REFERENCE SIGNS | |
|---|---|
| 1a, 1b | swing door |
| 2 | swing door system |
| 3a, 3b | transparent pane |
| 4a, 4b | spacer |
| 5 | mullion |
| 6 | part |
| 7a, 7b | sealing surface |
| 8a, 8b | gasket |
| 9 | non-transparent region |
| 10, 10' | horizontal diameter |
| 11 | depth |
| 12 | width |
| 13a, 13b | magnet |
| 14a, 14b | profile |
| 15a, 15b | layer |
| 16a, 16b | print |

-continued

| LIST OF REFERENCE SIGNS | |
|---|---|
| 17 | rotating axis |
| 18 | distance |
| 19 | thickness |
| 20 | gap |
| 21 | hinge |
| 22 | horizontal profile |
| 23a, 23b | wedge |
| 24 | inner part (mullion) |
| 25 | freezer device |
| 26 | cabinet |
| 27 | product |
| 28 | energy source |
| 29 | interface |
| 30 | depth |
| 31 | width |
| 32 | vertical side |
| 33 | insulation profile |
| 34 | thermally insulation material |
| 35 | protuberance |
| 36 | recess |
| 37 | passage |
| 38 | space |
| 39 | bonding material |

What is claimed is:

1. A swing door system for use with a freezer device, comprising:

two adjacent swing doors each having a transparent pane and a non-transparent area;

a mullion in contact with the two adjacent swing doors, wherein the mullion has a cross-section that is selected from a group consisting of T-shaped, Y-shaped, and triangle-shaped; and an insulation profile that is hollow with a closed continuous contour and that is attached to and extends along a length of the mullion, wherein the insulation profile insulates the mullion against an inside of the freezer device, wherein each non-transparent area is proximal to the mullion when the adjacent swing doors are in a closed position, wherein the non-transparent areas and the mullion define a non-transparent region, and wherein under a horizontal viewing angle between 0° and 180° with respect to the plane in which the two adjacent swing doors are arranged when the two adjacent swing doors are in the closed position all horizontal diameters of the non-transparent region are less than 100 mm.

2. The swing door system of claim 1, wherein at least one of the horizontal diameters is less than 80 mm.

3. The swing door system of claim 1, further comprising a ratio between a largest horizontal diameter and a smallest horizontal diameter that is less than 2.

4. The swing door system of claim 1, wherein the non-transparent region has a width that is less than 70 mm.

5. The swing door system of claim 1, wherein the non-transparent region has a depth that is less than 70 mm.

6. The swing door system of claim 1, wherein the mullion is integrally formed, at least in a region that extends from a bottom to a top of the two adjacent swing doors.

7. The swing door system of claim 1, wherein the mullion comprises two elements that are coupled to each other form-fit and/or force-fit and/or that are firmly bonded to each other, at least in a region that extends from a bottom to a top of the two adjacent swing doors.

8. The swing door system of claim 1, wherein the mullion comprises a cavity or is solid.

9. The swing door system of claim 1, wherein the mullion has a part that reaches in between the two adjacent swing doors when the swing doors are in the closed position.

10. The swing door system of claim 1, wherein the insulation profile is attached to the mullion selected from a group consisting of a form-fit, a force-fit, a bond, and any combinations thereof.

11. The swing door system of claim 1, wherein the insulation profile is made of a material selected from a group consisting of a plastic, a polymer, a polyvinyl chloride, and metal.

12. A swing door system for use with a freezer device, comprising:

two adjacent swing doors each having a transparent pane and a non-transparent area;

a mullion in contact with the two adjacent swing doors, wherein the mullion has a cross-section that is selected from a group consisting of T-shaped, Y-shaped, and triangle-shaped; and an insulation profile attached to the mullion by a force-fit at least at different fixation points of the mullion and that extends along a length of the mullion, wherein the insulation profile is hollow with a closed continuous contour, wherein the insulation profile insulates the mullion against an inside of the freezer device, wherein each non-transparent area is proximal to the mullion when the adjacent swing doors are in a closed position, wherein the non-transparent areas and the mullion define a non-transparent region, wherein under a horizontal viewing angle between 0° and 180° with respect to the plane in which the two adjacent swing doors are arranged when the two adjacent swing doors are in the closed position all horizontal diameters of the non-transparent region are less than 100 mm, and wherein the insulation profile comprises a space filled with a thermally insulating material selected from a group consisting of foam, polyurethane (PUR) foam, gas-fill, and a vacuum.

13. The swing door system of claim 1, wherein the mullion comprises at least one two sealing surface each inclined with respect to the plane in which the two adjacent swing doors are arranged when the two adjacent swing doors are in the closed position.

14. The swing door system of claim 1, further comprising a gasket attached to a location selected from a group consisting of the mullion, the insulation profile, at least one of the two adjacent swing doors, and any combinations thereof.

15. The swing door system of claim 14, wherein the gasket and the insulation profile form a barrier between the mullion and an interior of a freezer when the two adjacent swing doors are in the closed position.

16. The swing door system of claim 1, further comprising a magnetic connection that magnetically connects the two adjacent swing doors to the mullion when the two adjacent swing doors are in the closed position.

17. The swing door system of claim 1, further comprising a non-transparent ink in the non-transparent region.

18. The swing door system of claim 1, wherein the mullion is made of a material selected from a group consisting of metal, aluminum, steel, plastic, fiber reinforced plastic, plastic coated metal, plastic coated aluminum, and plastic coated steel.

19. The swing door system of claim 1, wherein each swing door is at least partly surrounded by a solid profile with an L-shaped cross-section.

20. The swing door system of claim 19, further comprising a gasket arranged to form a barrier between the solid profile and an interior of a freezer when the two adjacent swing doors are in the closed position.

21. The swing door system of claim 1, wherein at least one of the two adjacent swing doors has a rotating axis having a position selected from a group consisting of the non-transparent region, off-center with respect to a depth of the non-transparent region, an area between the two adjacent swing doors, and any combinations thereof.

22. The swing door system of claim 1, wherein at least one of the two adjacent swing doors comprises a hinge at opposite ends.

23. A freezer device, comprising a cabinet and the swing door system of claim 1 arranged in the cabinet such that the opening direction of the swing door system is horizontal.

24. A swing door system for use with a freezer device, comprising:

two adjacent swing doors each having a transparent pane and a non-transparent area;

a mullion in contact with the two adjacent swing doors and that comprises at least one sealing surface, wherein the mullion has a cross-section that is selected from a group consisting of T-shaped, Y-shaped, and triangle-shaped;

an insulation profile attached to the mullion that is hollow with a closed continuous contour and that extends along a length of the mullion, wherein the insulation profile entirely insulates the mullion against an inside of the freezer device; and a gasket provided in an area of the at least one sealing surface, wherein each non-transparent area is proximal to the mullion when the adjacent swing doors are in a closed position, wherein the non-transparent areas and the mullion define a non-transparent region, wherein under a horizontal viewing angle between 0° and 180° with respect to the plane in which the two adjacent swing doors are arranged when the two adjacent swing doors are in the closed position all horizontal diameters of the non-transparent region are less than 100 mm, and wherein the gasket and the insulation profile form a barrier between the mullion and an interior of a freezer when the two adjacent swing doors are in the closed position.

* * * * *